(12) United States Patent
Takami et al.

(10) Patent No.: US 9,445,122 B2
(45) Date of Patent: Sep. 13, 2016

(54) ENCODING APPARATUS, ENCODING METHOD, AND A COMPUTER-READABLE RECORDING MEDIUM

(71) Applicant: JVC KENWOOD Corporation, Yokohama-shi (JP)

(72) Inventors: Maki Takami, Yokohama (JP); Hideki Aiba, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 14/631,371

(22) Filed: Feb. 25, 2015

(65) Prior Publication Data

US 2015/0245060 A1    Aug. 27, 2015

(30) Foreign Application Priority Data

Feb. 25, 2014  (JP) .................................. 2014-034616

(51) Int. Cl.
*G06K 9/36* (2006.01)
*H04N 19/593* (2014.01)
*H04N 19/182* (2014.01)

(52) U.S. Cl.
CPC .......... *H04N 19/593* (2014.11); *H04N 19/182* (2014.11)

(58) Field of Classification Search
None
See application file for complete search history.

(56) References Cited

U.S. PATENT DOCUMENTS

| | | | | |
|---|---|---|---|---|
| 4,870,695 A * | 9/1989 | Gonzales | ............... | H04N 19/50 375/240.12 |
| 5,798,751 A * | 8/1998 | Kanda | ................... | H04N 19/85 345/615 |
| 8,311,107 B2 * | 11/2012 | Odagiri | ............... | H04N 19/105 375/240.12 |
| 2001/0026588 A1 * | 10/2001 | Kim | ..................... | H04N 19/428 375/240.12 |
| 2006/0067403 A1 * | 3/2006 | Sakai | ................... | H04N 7/0125 375/240.12 |
| 2006/0120456 A1 * | 6/2006 | Tasaka | .................. | H04N 19/55 375/240.16 |
| 2010/0220790 A1 * | 9/2010 | Jeon | ....................... | H04N 19/55 375/240.16 |
| 2013/0077883 A1 * | 3/2013 | Ogawa | .................... | G06K 9/36 382/233 |
| 2013/0188706 A1 * | 7/2013 | Minezawa | ....... | H04N 19/00569 375/240.12 |

FOREIGN PATENT DOCUMENTS

JP         07-015347         1/1995

* cited by examiner

*Primary Examiner* — Li Liu (74) *Attorney, Agent, or Firm* — Venable LLP; Michael A. Sartori (57) ABSTRACT

An encoding method includes encoding a difference between an input pixel included in input image data and a predicted pixel obtained by predicting the input pixel, storing a decoded pixel obtained by decoding the encoded difference and adding the predicted pixel to the decoded difference, in a case where the input image data is compound image data including different images with a line period of at least two lines, determining a direction from a decoded pixel that is included in a second decoded pixel, a third decoded pixel, and fourth decoded pixels stored and that has high correlation with a first decoded pixel, toward the first decoded pixel as a prediction direction, and selecting a decoded pixel in accordance with the determined prediction direction, and output the decoded pixel as the predicted pixel.

3 Claims, 6 Drawing Sheets

HORIZONTAL DIRECTION
(ONE LINE PERIOD DIRECTION)

VERTICAL DIRECTION
(ONE FRAME PERIOD
DIRECTION)

ENCODING APPARATUS, ENCODING METHOD, AND A COMPUTER-READABLE RECORDING MEDIUM

CROSS-REFERENCE TO RELATED APPLICATION(S)

The present application claims priority to and incorporates by reference the entire contents of Japanese Patent Application No. 2014-034616 filed in Japan on Feb. 25, 2014.

BACKGROUND OF THE INVENTION

1. Field of the Invention

The present invention relates to an encoding apparatus, an encoding method, and an a computer-readable recording medium suitable for use at the time when conducting compression encoding on image data.

2. Description of the Related Art

With spread of image recording devices corresponding to digital Hi-Vision broadcasts and HD (High Definition) images, and attainment of higher resolutions of digital cameras, larger screens and higher resolutions are promoted in TV sets used in homes as well. As for an LSI (Large-Scale Integration) which conduct image processing in TV sets as well, therefore, demands for LSIs corresponding to HD images are increasing.

By the way, as for enhancer, frame rate conversion processing and so forth in the image processing, it is necessary to store image data of at least one frame in a memory allowing fast access, such as a DDR SDRAM (Double-Data-Rate Synchronous Dynamic Random Access Memory). Such a memory which stores image data is demanded to access fast, and consequently such a memory is expensive. Furthermore, in some cases, a plurality of large-capacity memories are needed to store a plurality of frames of image data of the above-described HD image. This causes an increase in product cost and the number of parts.

Therefore, a technique of conducting compression encoding on image data and storing resultant image data has been developed conventionally. As one of compression encoding systems of image data, the MPEG (Moving Pictures Experts Group) system is known. Since the algorithm is complicated, however, a large area is occupied when the circuit is formed by using an LSI. Therefore, the MPEG system is not suitable for application to signal processing LSIs specialized for high picture quality processing of images or inexpensive image processing LSIs. JP 7-15347 A, discloses a method of conducting compression encoding by predicting a pixel value of an object pixel in a one-dimension form by using a pixel value of a pixel next to the object pixel in a line direction (horizontal direction) and completed in encoding, prior to encoding of the object pixel.

Furthermore, a method of predicting a pixel value of an object pixel in a two-dimensional form and conducting compression encoding by using pixel values of a pixel on a position (horizontal position) on a line corresponding to the object pixel on a line immediately preceding a line including the object pixel in encoding order and neighboring pixels is also known. It becomes possible to improve the encoding efficiency by using the method of predicting a pixel value in a two-dimensional form as compared with a case where a pixel value is predicted in a one-dimensional form.

By the way, in recent years, the technique concerning the so-called 3D video in which a two-dimensional image is displayed stereoscopically has advanced and devices for supplying 3D videos have also spread. As one of transmission formats of 3D video, there is an LBL (Line-by-Line) system in which image signals for the left eye and the right eye are disposed and displayed on every other line alternately.

In the LBL system, it is considered that correlation between adjacent lines is small as compared with ordinary images. In a case where the above-described compression encoding system in which a pixel value is predicted in the two-dimensional form is applied to an image signal according to the LBL system, therefore, if a prediction direction is determined in a position other than the object pixel position, there is a possibility that the prediction direction might differ from a prediction direction in which a prediction error becomes minimum in the actual object pixel position. In this case, the prediction error in the longitudinal direction becomes large sometimes. This results in a problem that there is a possibility that the prediction error will propagate in a downward direction in some cases.

SUMMARY OF THE INVENTION

It is an object of the present invention to at least partially solve the problems in the conventional technology.

There is provided an encoding apparatus that includes an encoding unit configured to encode a difference between an input pixel included in input image data and a predicted pixel obtained by predicting the input pixel; a first storage unit configured to store a decoded pixel obtained by decoding the difference encoded by the encoding unit and adding the predicted pixel to the decoded difference; a prediction direction determination unit configured, in a case where the input image data is compound image data including different images with a line period of at least two lines, to determine a direction from a decoded pixel that is included in a second decoded pixel, a third decoded pixel, and fourth decoded pixels stored in the first storage unit and that has high correlation with a first decoded pixel, toward the first decoded pixel as a prediction direction, the first decoded pixel having a position in a line direction corresponding to an encoding object pixel, on a second line located, in an encoding order, a number of lines of the line period before a first line on which the encoding object pixel is located, the second decoded pixel being located, in an encoding order, one pixel before the first decoded pixel, the third decoded pixel having an on-line position corresponding to the first decoded pixel on a third line located, in an encoding order, the number of lines before the second line, the fourth decoded pixels including decoded pixels next to the third decoded pixel on the third line; and a selection unit configured to select a decoded pixel from the first storage unit in accordance with the prediction direction determined by the prediction direction determination unit, and output the decoded pixel as the predicted pixel.

There is also provided an encoding method that includes an encoding step of encoding a difference between an input pixel included in input image data and a predicted pixel obtained by predicting the input pixel; a first storage step of storing a decoded pixel obtained by decoding the difference encoded by the encoding step and adding the predicted pixel to the decoded difference, into a first storage unit; a prediction direction determination step of, in a case where the input image data is compound image data including different images with a line period of at least two lines, determining a direction from a decoded pixel that is included in a second decoded pixel, a third decoded pixel, and fourth decoded pixels stored in the first storage unit and that has high correlation with a first decoded pixel, toward the first decoded pixel as a prediction direction, the first decoded pixel having a position in a line direction corresponding to an encoding object pixel, on a second line located, in an encoding order, a number of lines of the line period before a first line on which the encoding object pixel is located, the second decoded pixel being located, in an encoding order, one pixel before the first decoded pixel, the third decoded pixel having an on-line position corresponding to the first decoded pixel on a third line located, in an encoding order, the number of lines before the second line, the fourth decoded pixels including decoded pixels next to the third decoded pixel on the third line; and a selection step of selecting a decoded pixel from the first storage unit in accordance with the prediction direction determined by the prediction direction determination step, and output the decoded pixel as the predicted pixel.

There is further provided a computer-readable recording medium that stores therein a computer program for causing a computer to execute an encoding method, the method including an encoding step of encoding a difference between an input pixel included in input image data and a predicted pixel obtained by predicting the input pixel; a first storage step of storing a decoded pixel obtained by decoding the difference encoded by the encoding step and adding the predicted pixel to the decoded difference, into a first storage unit; a prediction direction determination step of, in a case where the input image data is compound image data including different images with a line period of at least two lines, determining a direction from a decoded pixel that is included in a second decoded pixel, a third decoded pixel, and fourth decoded pixels stored in the first storage unit and that has high correlation with a first decoded pixel, toward the first decoded pixel as a prediction direction, the first decoded pixel having a position in a line direction corresponding to an encoding object pixel, on a second line located, in an encoding order, a number of lines of the line period before a first line on which the encoding object pixel is located, the second decoded pixel being located, in an encoding order, one pixel before the first decoded pixel, the third decoded pixel having an on-line position corresponding to the first decoded pixel on a third line located, in an encoding order, the number of lines before the second line, the fourth decoded pixels including decoded pixels next to the third decoded pixel on the third line; and a selection step of selecting a decoded pixel from the first storage unit in accordance with the prediction direction determined by the prediction direction determination step, and output the decoded pixel as the predicted pixel.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereafter, preferred embodiments of an encoding apparatus and an encoding method will be described in detail with reference to the accompanying drawings. Concrete numerical values, exterior views, configurations and so forth shown in such embodiments are nothing but examples facilitating understanding of the present invention. Unless otherwise noted, the concrete numerical values, exterior views, configurations and so forth do not restrict the present invention. By the way, as for elements that have no direct relation to the present invention, detailed description and illustration are omitted.

(Encoding Method According to Existing Technique)

Figure 1:
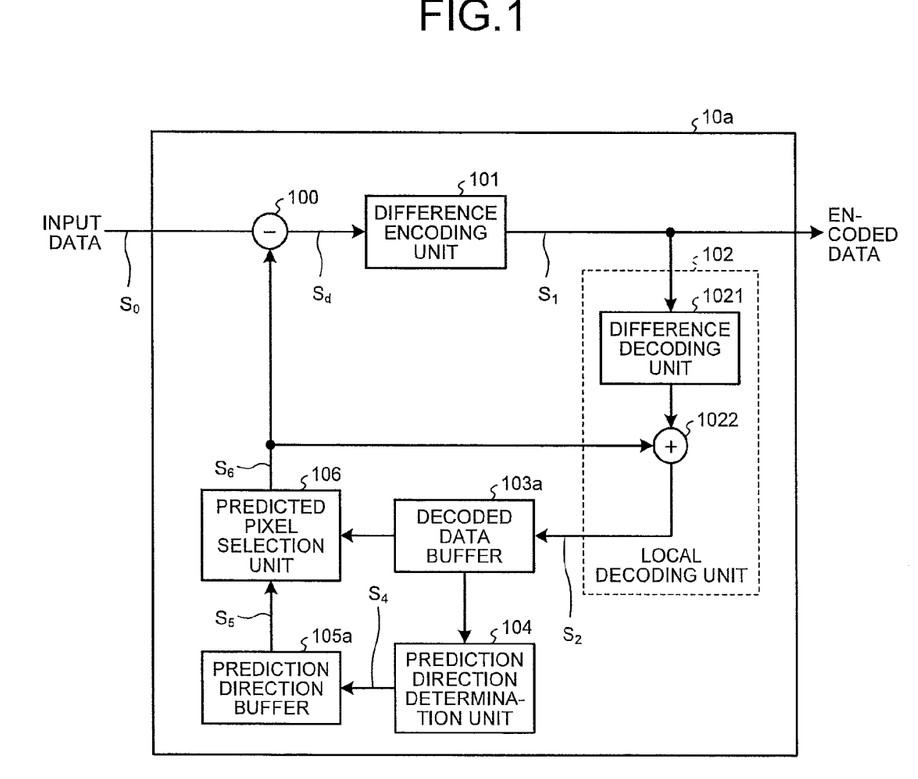
FIG. 1 is a block diagram illustrating a configuration of an example of an encoding apparatus according to an existing technique.

First, in order to facilitate understanding, an encoding method according to an existing technique will now be described. FIG. 1 illustrates a configuration of an example of an encoding apparatus according to the existing technique. In FIG. 1, an encoding apparatus 10a includes a subtracter 100, a difference encoding unit 101, a local decoding unit 102, a decoded data buffer 103a, a prediction direction determination unit 104, a prediction direction buffer 105a, and a predicted pixel selection unit 106. Furthermore, the local decoding unit 102 includes a difference decoding unit 1021 and an adder 1022.

It is supposed that image data (referred to as image data in the ordinary system) having an image format in which one frame has one image is input to the encoding apparatus 10a as input, for example, from a top end of an image toward a bottom end line by line in order. Furthermore, in each line, image data is input from a left end side of an image toward a right end side pixel by pixel in order. Input pixel data $S_0$ is input. The input pixel data $S_0$ is encoded, and encoded data $S_1$ which is smaller in bit width is output.

The input pixel data $S_0$ is supplied to the encoding apparatus 10a as the object pixel, and input to a minuend input end of the subtracter 100. A predicted pixel value $S_6$ which is output from the predicted pixel selection unit 106 described later is input to a subtrahend input end of the subtracter 100. The subtracter 100 subtracts a pixel value of the predicted pixel value $S_6$ which is input to the subtrahend input end from a pixel value of the input pixel data $S_0$ which is input to the minuend input end, and outputs a difference value $S_d$ to the difference encoding unit 101.

The difference encoding unit 101 encodes the difference value $S_d$ by using a predetermined encoding processing method, and outputs encoded data $S_1$ which is smaller in bit width than the input pixel data $S_0$. The encoding method used by the difference encoding unit 101 is not especially restricted. For example, however, quantization using a quantizing table can be used as the encoding method. The encoded data $S_1$ is output to external of the encoding apparatus 10a as output data.

After being output from the encoding apparatus 10a, the encoded data $S_1$ is supplied to a decoding apparatus via a transmission path, a recording path, or the like and decoded. As a result, decoded pixel data which is the same in bit width as the input pixel data $S_0$ is obtained. By the way, as for the decoded pixel data, an error (decoding error) from the input pixel data $S_0$ which is input to the encoding apparatus 10a is caused in the process of encoding and decoding processing. Therefore, the decoded pixel data does not necessarily coincide in data value with the input pixel data $S_0$.

The encoded data $S_1$ which is output from the difference encoding unit 101 is supplied to the local decoding unit 102 as well. The encoded data $S_1$ supplied to the local decoding unit 102 is input to the difference decoding unit 1021.

The difference decoding unit 1021 conducts processing opposite to the processing conducted in the difference encoding unit 101, on the encoded data $S_1$ which is input, to decode the encoded data $S_1$, and inputs decoded data to a first input end of the adder 1022. The above-described predicted value $S_6$ is input to a second input end of the adder 1022 from the predicted pixel selection unit 106 described later. The adder 1022 adds up the data value input to the first input end and the predicted pixel value $S_6$ input to the second input end, and outputs a result as decoded data $S_2$.

The decoded data $S_2$ is stored in the decoded data buffer 103a. The decoded data buffer 103a is made capable of storing image data corresponding to at least one line+one pixel. One pixel added to pixels corresponding to one line may be retained separately in an FF (Flip Flop) circuit or the like. Furthermore, the decoded data buffer 103a is controlled in an FIFO (First In, First Out) system. If pixel data corresponding to one pixel is input to the decoded data buffer 103a in a state in which pixel data corresponding to one line is stored, pixel data of one pixel stored the earliest is swept out. Pixel data swept out from the decoded data buffer 103a is, for example, discarded.

The decoded data buffer 103a provides the prediction direction determination unit 104 with peripheral pixels of the object pixel including decoded data located one line above the object pixel, i.e., decoded data located on one line before, in encoding order, a line on which the object pixel is located.

Figure 2:
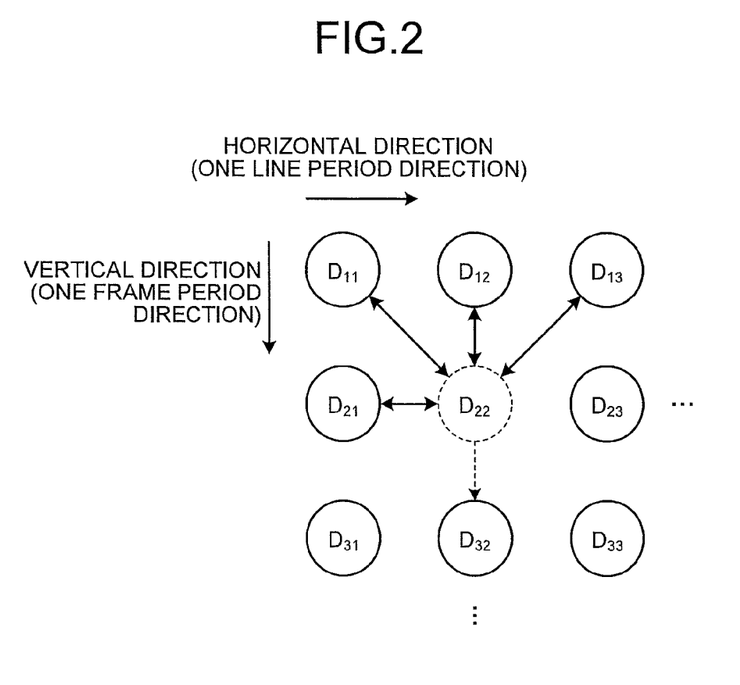
FIG. 2 is a diagram for explanation of peripheral pixels of an object pixel provided by a decoding data buffer according to the existing technique.

Peripheral pixels of the object pixel provided by the decoded data buffer 103a will now be described with reference to FIG. 2. In FIG. 2, an abscissa axis indicates a horizontal direction, i.e., a one-line period direction of an image, and an ordinate axis indicates a vertical direction, i.e., a one-frame period direction of the image. In each of pixels $D_{11}, D_{12}, \ldots, D_{21}, D_{22}, \ldots, D_{31}, D_{32}, \ldots$, the subscript indicates a line number and a pixel position (horizontal pixel position) on a line, from the left. In other words, pixels $D_{11}$, $D_{12}$, and $D_{13}$ are pixels on a first line, and pixels $D_{12}$, $D_{22}$, and $D_{32}$ are pixels having corresponding positions on respective lines.

Peripheral pixels of the object pixel are encoded pixels located in the vicinity to the object pixel. As for peripheral pixels, therefore, a pixel located before the object pixel in the encoding order is selected. In a case where the object pixel is set to be the pixel $D_{22}$ in the example in FIG. 2, the pixel $D_{21}$ located on the same line as the pixel $D_{22}$ and located one pixel before the pixel $D_{22}$ in the encoding order is selected as a peripheral pixel. In addition, as a peripheral pixel of the pixel $D_{22}$, the pixel $D_{12}$ that is on a line located in the encoding order one line before the line on which the pixel $D_{22}$ is located and that corresponds in position on line to the pixel $D_{22}$ is selected. In addition, as a peripheral pixel of the pixel $D_{22}$, pixels $D_{11}$ and $D_{13}$ located on the same line as the pixel $D_{12}$ and next to the pixel $D_{12}$ are selected.

The prediction direction determination unit 104 uses the above-described object pixel and peripheral pixels which are provided from the decoded data buffer 103a, selects a direction from among a plurality of directions, giving priority to directions having the higher correlation between the object pixel and peripheral pixels, sets the selected direction as a prediction direction, and outputs prediction direction data $S_4$ which indicates the prediction direction. For example, the prediction direction determination unit 104 selects a direction having the highest correlation between the object pixel and the peripheral pixels, and determines the selected direction as the prediction direction.

For example, in a case where the peripheral pixels are pixels respectively located on the left next to, just above, on the left above, and on the right above the object pixel (four pixels $D_{21}$, $D_{12}$, $D_{11}$ and $D_{13}$ in the example in FIG. 2), the prediction direction determination unit 104 sets four directions, i.e., the horizontal direction, vertical direction, obliquely upper left direction, and obliquely upper right direction as candidates. The prediction direction determination unit 104 finds difference values between a pixel value of the object pixel and pixel values of respective peripheral pixels. The prediction direction determination unit 104 calculates an evaluation value, which indicates a correlation between each peripheral pixel and the object pixel, by conducting a predetermined arithmetic operation on the basis of each of the found difference values, and determines a prediction direction from among four candidate directions on the basis of the calculated evaluation values.

As for the evaluation values, for example, respective difference values of pixel values found for respective peripheral pixels can be used. A calculation method of the evaluation values is not restricted to the calculation method of the difference values, but a different method may be used. Furthermore, the positions and the number of pixels for which differences are found when calculating the evaluation values are not restricted to the above-described example.

The prediction direction data $S_4$ is stored in the prediction direction buffer 105a. The prediction direction buffer 105a stores the prediction direction data $S_4$ for a predetermined period. The period for which the prediction direction buffer 105a stores the prediction direction data $S_4$ can be set according to, for example, a known data delay of prediction direction data $S_5$ needed by the predicted pixel selection unit 106 which will be described later, from the prediction direction data $S_4$ supplied from the prediction direction determination unit 104.

The prediction direction buffer 105a provides the predicted pixel selection unit 106 with the prediction direction data $S_5$ for selecting decoded data stored in the decoded data buffer 103a. More specifically, in the example in FIG. 2, the prediction direction data $S_5$ provided by the prediction direction buffer 105a is prediction direction data already found for a pixel located on a line that is one line above the object pixel, i.e., on a line that is, in the encoding order, one line before a line on which the object pixel is located, and located in an on-line position corresponding to that of the object pixel. In the example in FIG. 2, the prediction direction data $S_5$ found on the basis of the object pixel $D_{22}$ is applied to the pixel $D_{32}$ located one line below the pixel $D_{22}$. In other words, the pixel $D_{32}$ becomes an encoding object pixel to which the prediction direction data $S_4$ found on the basis of the object pixel is applied.

The predicted pixel selection unit 106 selects pixel data of a pixel corresponding to a prediction direction indicated in the prediction direction data $S_5$ included in pixel data of peripheral pixels for the object pixel, from among pixel data stored in the decoded data buffer 103*a*. The predicted pixel selection unit 106 acquires pixel data of the selected pixel from the decoded data buffer 103*a*, and outputs the pixel value of the pixel data as the above-described predicted pixel value $S_6$.

First Embodiment

Figure 3:
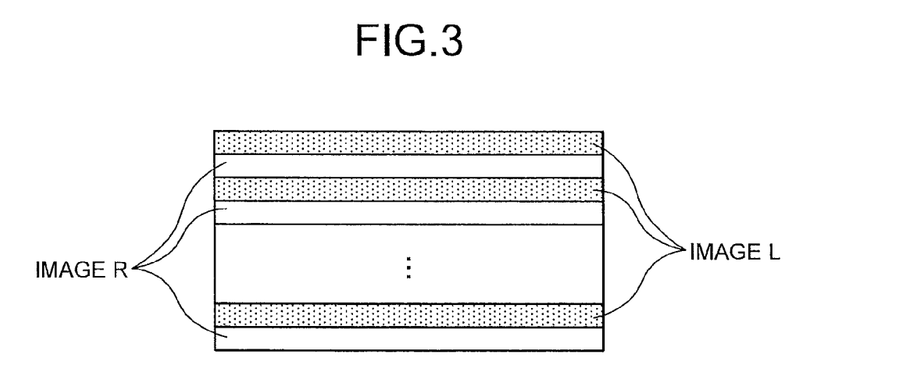
FIG. 3 is a diagram schematically illustrating image data according to the LBL system.

An encoding method according to a first embodiment will now be described. As one of transmission formats of a 3D video, there is an LBL (Line-by-Line) system in which image signals for the left eye and image signals for the right eye are disposed and displayed on every other line alternately. FIG. 3 schematically illustrates image data according to the LBL system. As exemplified in FIG. 3, the image data according to the LBL system is compound image data in which image data in one frame is formed by disposing image data of an image L for the left eye and image data of an image R for the right eye on every other line alternately. In this way, the image data of the LBL system includes the image L and the image R, which are images differing from each other, with a two-line period.

In the above-described encoding method according to the existing technique, a pixel located one line above the object pixel, i.e., a pixel on a line located in the encoding order one line before the line on which the object pixel is located is always used as a peripheral pixel of the object pixel. On the other hand, as for image data according to the LBL system, different image data are disposed on every other line alternately in image data of one frame as exemplified in FIG. 3. In a case where the above-described object pixel and peripheral pixels according to the existing technique are applied to image data having a format according to the LBL system, there is a possibility that correlation between the object pixel and the peripheral pixels will become extremely low. Therefore, it is considered that peripheral pixels used in the encoding method according to the existing technique are not suitable as candidates of pixels for obtaining predicted pixel values.

In the present first embodiment, therefore, a pixel on a line located in the encoding order two lines before a line on which the object pixel is located is used as a peripheral pixel of the object pixel. As a result, the object pixel and the peripheral pixel can be selected from the same image among the image L and the image R, and it becomes possible to acquire a predicted pixel value suitably.

Figure 4:
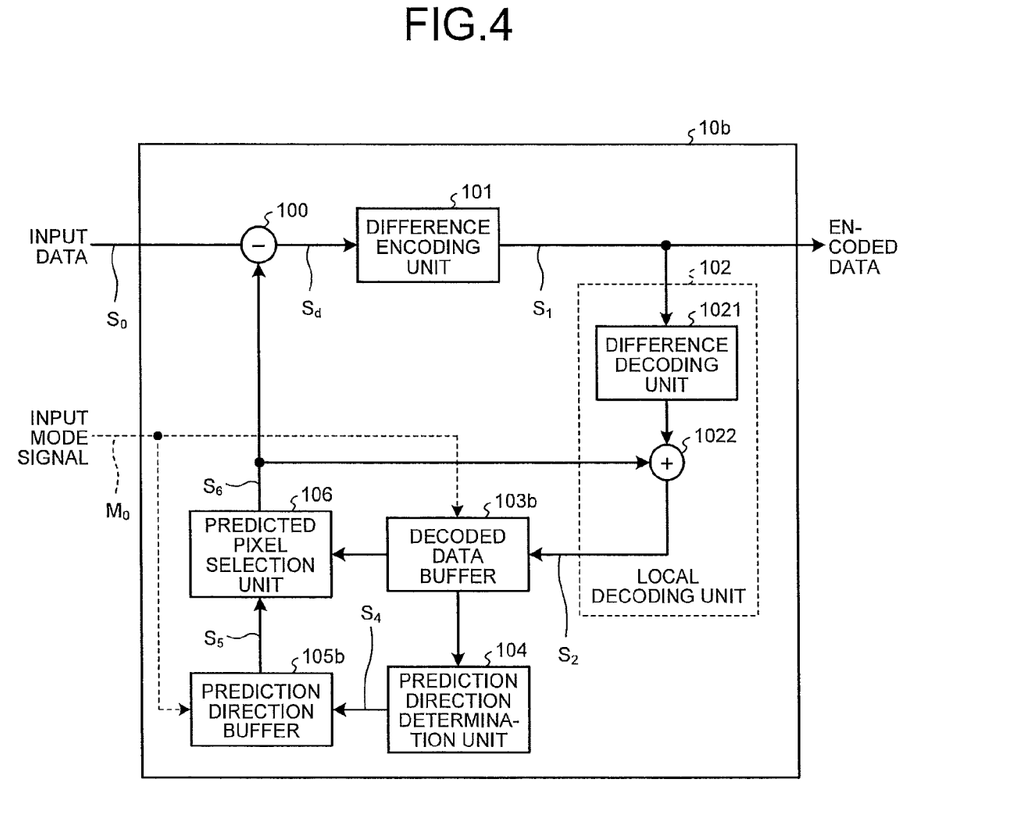
FIG. 4 is a block diagram illustrating a configuration of an example of an encoding apparatus according to a first embodiment.

FIG. 4 illustrates a configuration of an example of an encoding apparatus according to the first embodiment. By the way, in FIG. 4, portions common to FIG. 1 described above are denoted by same characters, and detailed description will be omitted.

In FIG. 4, an encoding apparatus 10*b* differs from the encoding apparatus 10*a* illustrated in FIG. 1 in that an input mode signal $M_0$ is input. The input mode signal $M_0$ is a signal indicating whether input data is image data according to the LBL system or image data according to the ordinary system. The input mode signal $M_0$ changes over operation of a decoded data buffer 103*b* and a prediction direction buffer 105*b*.

The input mode signal $M_0$ is input according to, for example, user's operation to a higher rank device to which the encoding apparatus 10*b* is applied. Inputting of the input mode signal $M_0$ is not restricted to this. The input mode signal $M_0$ may be included in a predetermined position of input data and supplied. In this case, the input mode signal $M_0$ is taken out from the input data, for example, in a stage preceding the encoding apparatus 10*b* and supplied to the encoding apparatus 10*b*.

Hereafter, an operation of the encoding apparatus 10*b* in a case where the input mode signal $M_0$ indicates that the input data is image data according to the LBL system will be described. By the way, an operation of the encoding apparatus 10*b* in a case where the input mode signal $M_0$ indicates that the input data is image data according to the ordinary system becomes equivalent to the above-described operation of the encoding apparatus 10*a* according to the existing technique.

In the encoding apparatus 10*b* according to the first embodiment, the decoded data buffer 103*b* provides the prediction direction determination unit 104 with peripheral pixels of an object pixel including a pixel located one pixel before the object pixel in the encoding order on the line on which the object pixel is located and decoded data on a line located two lines above the line on which the object pixel is located, i.e., decoded data on a line located in the encoding order two lines before the line on which the object pixel is located. In other words, the decoded data buffer 103*b* according to the first embodiment is made capable of storing pixel data corresponding to at least two lines+one pixel. One pixel added to pixels corresponding to two lines may be retained separately in an FF circuit or the like.

Figure 5:
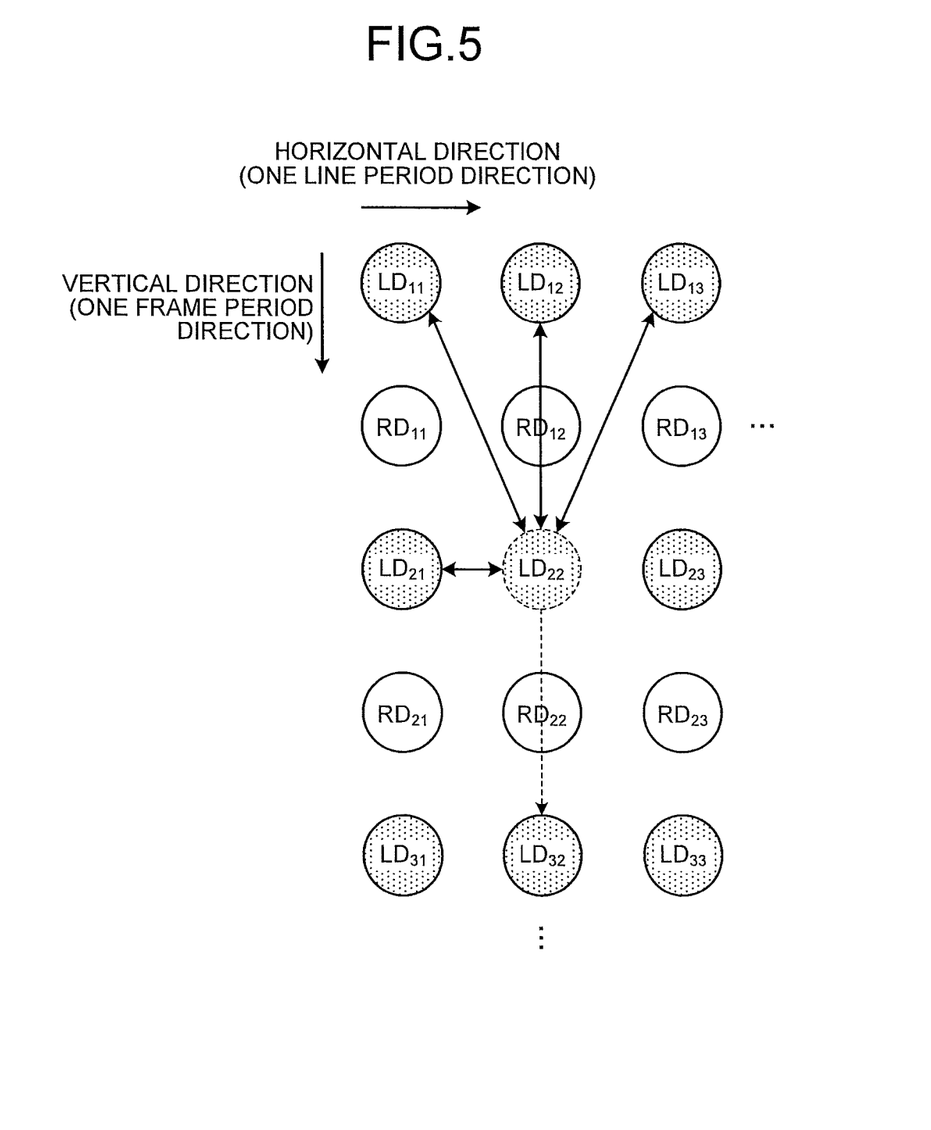
FIG. 5 is a diagram for explanation of peripheral pixels of an object pixel provided by a decoding data buffer according to the first embodiment.

Peripheral pixels of the object pixel provided by the decoded data buffer 103*b* according to the first embodiment will now be described with reference to FIG. 5. In FIG. 5, an abscissa axis indicates a horizontal direction, i.e., a one-line period direction of an image, and an ordinate axis indicates a vertical direction, i.e., a one-frame period direction of the image, in the same way as FIG. 2. Respective pixels $LD_{11}$, $LD_{12}$, ..., $LD_{21}$, $LD_{22}$, ..., $LD_{31}$, $LD_{32}$, ... indicate pixels on respective lines of an image L for the left eye. Furthermore, respective pixels $RD_{11}$, $RD_{12}$, ..., $RD_{21}$ $RD_{22}$, ... indicate pixels on respective lines of an image R for the right eye. As for meaning of each subscript, a line number in the image L or the image R and a pixel position on the line are indicated from the left. For example, in a case where it is supposed that a line on which the pixels $LD_{11}$, $LD_{12}$, ... are located is a line of a first line in the frame, a line on which pixels $RD_{11}$, $RD_{12}$, ... are located becomes a line of a second line in the frame.

In a case where the object pixel is the pixel $LD_{22}$, in the first embodiment, the pixel $LD_{21}$ located on the same line as the pixel $LD_{22}$ and located in the encoding order one pixel before the pixel $LD_{22}$ is selected as a peripheral pixel. In addition, the pixel $LD_{12}$ on a line located in the encoding order two lines before the line on which the pixel $LD_{22}$ is located, and located in an on-line position corresponding to that of the pixel $LD_{22}$ is selected as a peripheral pixel of the pixel $LD_{22}$. In addition, the pixel $LD_{11}$ and a pixel $LD_{13}$ located on the same line as the pixel $LD_{12}$ and next to the pixel $LD_{12}$ are selected as peripheral pixels of the pixel $LD_{22}$.

This is true of respective pixels in the image R for the right eye as well. For example, in a case where the pixel $RD_{22}$ is set to be an object pixel in the image R for the right eye, peripheral pixels for the pixel $RD_{22}$ become the pixel $RD_{21}$ located on the same line as the pixel $RD_{22}$, and the pixels $RD_{11}$ and $RD_{12}$ and a pixel $RD_{13}$ on a line located in the encoding order two lines before the line on which the pixel $RD_{22}$ is located.

In a case where the input mode signal $M_0$ indicates that input data is image data according to the LBL system, in the encoding apparatus 10*b* in the first embodiment, the object pixel and the peripheral pixels of the object pixel become data in the same image, i.e., in the image L or the image R, in this way. As a result, correlation between the object pixel and the peripheral pixels is maintained.

The prediction direction determination unit 104 uses the above-described object pixel and peripheral pixels including decoded data on a line located in the encoding order two lines before the line on which the object pixel is located, which are provided from the decoded data buffer 103a, selects a direction from among a plurality of directions, giving priority to directions having the higher correlation between the object pixel and the peripheral pixels, sets the selected direction as a prediction direction, and outputs prediction direction data $S_4$ which indicates the prediction direction. For example, the prediction direction determination unit 104 selects a direction having the highest correlation between the object pixel and the peripheral pixels, and determines the selected direction as the prediction direction.

The prediction direction data $S_4$ is stored in the prediction direction buffer 105b. The prediction direction buffer 105b stores the prediction direction data $S_4$ for a predetermined period. The period for which the prediction direction buffer 105b stores the prediction direction data $S_4$ can be set according to a known data delay of prediction direction data $S_5$ needed by the predicted pixel selection unit 106, from the prediction direction data $S_4$ supplied from the prediction direction determination unit 104, in the same way as the foregoing description.

The prediction direction buffer 105b provides the predicted pixel selection unit 106 with the prediction direction data $S_5$ for selecting decoded data stored in the decoded data buffer 103b. More specifically, in the example in FIG. 5, the prediction direction data $S_5$ provided by the prediction direction buffer 105b according to the first embodiment is prediction direction data already found for a pixel located on a line that is two lines above the object pixel, i.e., on a line that is, in the encoding order, two lines before a line on which the object pixel is located, and located in an on-line position corresponding to that of the object pixel. In the example in FIG. 5, the prediction direction data $S_5$ found on the basis of the object pixel $LD_{22}$ is applied to the pixel $LD_{32}$ located two lines below the pixel $LD_{22}$. In other words, the pixel $LD_{32}$ becomes an encoding object pixel to which the prediction direction data $S_4$ found on the basis of the object pixel is applied.

The predicted pixel selection unit 106 selects pixel data of a pixel corresponding to a prediction direction indicated in the prediction direction data $S_5$ included in pixel data of peripheral pixels for the object pixel, from among pixel data stored in the decoded data buffer 103b.

For example, supposing that the object pixel is $LD_{22}$, a case where the prediction direction is one of on the left next to, just above, on the left above and on the right above will be considered. In this case, the predicted pixel selection unit 106 selects pixel data from among pixel data with which the decoded data buffer 103b is provided, on the basis of the prediction direction data $S_5$. If the prediction direction is on the left next to, the predicted pixel selection unit 106 selects pixel data of the pixel $LD_{21}$. If the prediction direction is just above, the predicted pixel selection unit 106 selects pixel data of the pixel $LD_{12}$. If the prediction direction is on the left above, the predicted pixel selection unit 106 selects pixel data of the pixel $LD_{11}$. If the prediction direction is on the right above, the predicted pixel selection unit 106 selects pixel data of the pixel $LD_{13}$.

The predicted pixel selection unit 106 outputs a pixel value of the pixel data selected in this way as the above-described predicted pixel value $S_6$. The predicted pixel value $S_6$ which is output from the predicted pixel selection unit 106 is input to a subtrahend input end of a subtracter 100 to which pixel data of a next input pixel, which is an encoding object pixel, is input at a minuend input end.

In the encoding apparatus 10a according to the above-described existing technique, the prediction direction buffer 105a always provides the prediction direction depending upon a pixel on a line located in the encoding order one line before a line on which the object pixel is located, no matter whether the input data is image data according to the LBL system. In a case where adjacent lines are generated by different images as in the image format of the LBL system, therefore, correlation between the object pixel and a pixel on a line located in the encoding order one line before is small, and consequently reliability of the prediction direction using a pixel located one line before becomes lower.

On the other hand, in the encoding apparatus 10b according to the first embodiment, the prediction direction buffer 105b can provide a prediction direction depending upon a pixel on a line located in the encoding order two lines before a line on which the object pixel is located, in the case where the input mode signal $M_0$ indicates that input data is image data according to the LBL system. Therefore, the pixel relating to the prediction direction and the object pixel become pixels in the same image, i.e., the image L or the image R. As a result, reliability of the prediction direction does not deteriorate.

By the way, in the above-described configuration, pixel data already encoded do not exist on, for example, a line at the head of a frame. Therefore, encoding is not conducted for the line at the head of the frame. In a case where the input mode signal $M_0$ indicates the LBL system, encoding is not conducted from the head of a frame to the second line.

(Decoding Apparatus)

Figure 6:
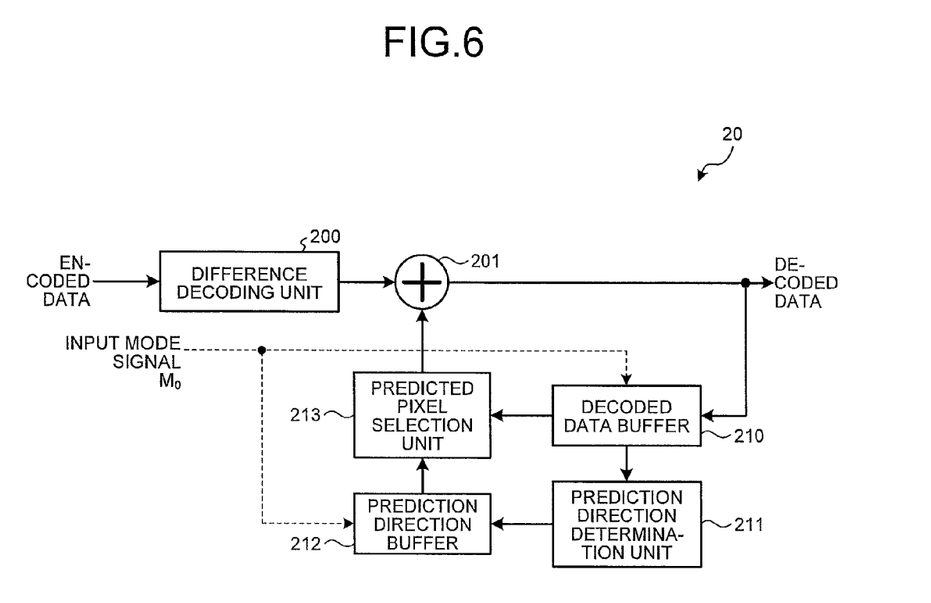
FIG. 6 is a block diagram illustrating a configuration of an example of a decoding apparatus that can be applied to the first embodiment.

A decoding apparatus configured to decode the encoded data $S_1$, which is output from the encoding apparatus according to the first embodiment, will now be described. The decoding apparatus basically conducts processing which is the opposite of the above-described processing conducted by the encoding apparatus 10b. FIG. 6 illustrates a configuration of an example of a decoding apparatus that can be applied to the first embodiment.

In FIG. 6, a decoding apparatus 20 includes a difference decoding unit 200, an adder 201, a decoded data buffer 210, a prediction direction determination unit 211, a prediction direction buffer 212, and a predicted pixel selection unit 213. In the decoding apparatus 20, an input mode signal $M_0$ is input, and supplied to the decoded data buffer 210 and the prediction direction buffer 212.

The encoded data obtained by encoding in the encoding apparatus 10b is input to the difference decoding unit 200. The difference decoding unit 200 decodes the input encoded data by conducting processing which is the opposite of the processing conducted in the difference encoding unit 101 in the same way as the above-described difference decoding unit 1021. Data which is output from the difference decoding unit 200 is input to a first input end of the adder 201. The adder 201 adds up the data which is input to the first input end and an output of the predicted pixel selection unit 213 described later which is input to a second input end. An output of the adder 201 is output from the decoding apparatus 20 to external as decoded data obtained by decoding the encoded data which is input to the decoding apparatus 20. The decoded data is pixel data that is the same in bit width as the input pixel data $S_0$ which is input to the encoding apparatus 10b.

The output of the adder 201 is supplied to the decoded data buffer 210 as well. The decoded data buffer 210 is made capable of storing decoded data, i.e., pixel data corresponding to at least two lines+one pixel in the same way as the above-described decoded data buffer 103b. One pixel added to pixels corresponding to two lines may be retained separately in an FF circuit or the like.

In a case where the input mode signal $M_O$ indicates image data according to the ordinary system, the decoded data buffer 210 provides the prediction direction determination unit 211 with peripheral decoded pixels of the object decoded pixel including decoded pixel data on a line located one line above the object decoded pixel, i.e., located in the decoding order one line before a line on which the object decoded pixel is located, in the same way as the above-described decoded data buffer 103b. Furthermore, In a case where the input mode signal $M_O$ indicates image data according to the LBL system, the decoded data buffer 210 provides the prediction direction determination unit 211 with peripheral decoded pixels of the object decoded pixel including decoded pixel data on a line located two lines above the object decoded pixel, i.e., located in the decoding order two lines before the line on which the object decoded pixel is located.

The prediction direction determination unit 211 uses the above-described object decoded pixel and peripheral decoded pixels which are provided from the decoded data buffer 210, selects a direction from among a plurality of directions, giving priority to directions having higher correlation between the object decoded pixel and peripheral decoded pixels, sets the selected direction as a prediction direction, and outputs prediction direction data which indicates the prediction direction, in the same way as the above-described prediction direction determination unit 104. For example, the prediction direction determination unit 211 selects a direction having the highest correlation between the object decoded pixel and the peripheral decoded pixels, and determines the selected direction as the prediction direction.

The prediction direction data is stored in the prediction direction buffer 212. The prediction direction buffer 212 stores the prediction direction data for a predetermined period in the same way as the above-described prediction direction buffer 105b. The period for which the prediction direction buffer 212 stores the prediction direction data can be set according to, for example, a known data delay of prediction direction data needed by the predicted pixel selection unit 213 which will be described later, from the prediction direction data supplied from the prediction direction determination unit 211.

The prediction direction buffer 212 provides the predicted pixel selection unit 213 with the prediction direction data for selecting decoded pixel data stored in the decoded data buffer 210 in the same way as the above-described prediction direction buffer 105b.

In a case where the input mode signal $M_O$ indicates image data according to the ordinary system, the prediction direction data provided by the prediction direction buffer 212 is, in the example illustrated in FIG. 2, prediction direction data already found for a decoded pixel located on a line that is one line above the object decoded pixel, i.e., on a line that is, in the decoding order, one line before a line on which the object decoded pixel is located, and located in an on-line position corresponding to that of the object decoded pixel. Furthermore, in a case where the input mode signal $M_O$ indicates image data according to the LBL system, the prediction direction data provided by the prediction direction buffer 212 is, in the example illustrated in FIG. 5, prediction direction data already found for a decoded pixel located on a line that is two lines above the object decoded pixel, i.e., on a line that is, in the decoding order, two lines before a line on which the object decoded pixel is located, and located in an on-line position corresponding to that of the object decoded pixel.

The predicted pixel selection unit 213 selects decoded pixel data of a decoded pixel corresponding to a prediction direction indicated in the prediction direction data included in decoded pixel data of peripheral pixels for the object decoded pixel, from among decoded pixel data stored in the decoded data buffer 210, in the same way as the above-described predicted pixel selection unit 106. The predicted pixel selection unit 213 acquires decoded pixel data of the selected decoded pixel from the decoded data buffer 210, and outputs a pixel value of the decoded pixel data to the second input end of the adder 201 as the above-described predicted pixel value.

Modification of First Embodiment

In the foregoing description, it has been described that the encoding apparatus 10b according to the first embodiment can be applied to, for example, encoding of image data in which two different images, i.e., the right eye image R and the left eye image L are included in an image of one frame. However, the encoding apparatus 10b is not restricted to this example. In other words, the encoding apparatus 10b can also be applied to encoding of image data in which at least three images are included in an image of one frame. For example, in a case where N images are included in an image of one frame, where N is an integer of at least 2, the image is formed by disposing lines of N different images in order with a period of N lines.

For example, in the encoding apparatus 10b, the decoded data buffer 103b is configured to provide the prediction direction determination unit 104 with peripheral pixels of an object pixel including a pixel located one pixel before the object pixel in the encoding order on the line on which the object pixel is located and decoded data on a line located N lines above the line on which the object pixel is located, i.e., decoded data on a line located in the encoding order N lines before the line on which the object pixel is located. In this case, the decoded data buffer 103b is made capable of storing image data corresponding to at least N lines+one pixel. One pixel added to pixels corresponding to N lines may be retained separately in an FF circuit or the like. The prediction direction buffer 105b is also configured in the same way to provide prediction direction data to be applied to a pixel on a line located in the encoding order N lines below the line on which the object pixel is located.

Second Embodiment

Figure 7:
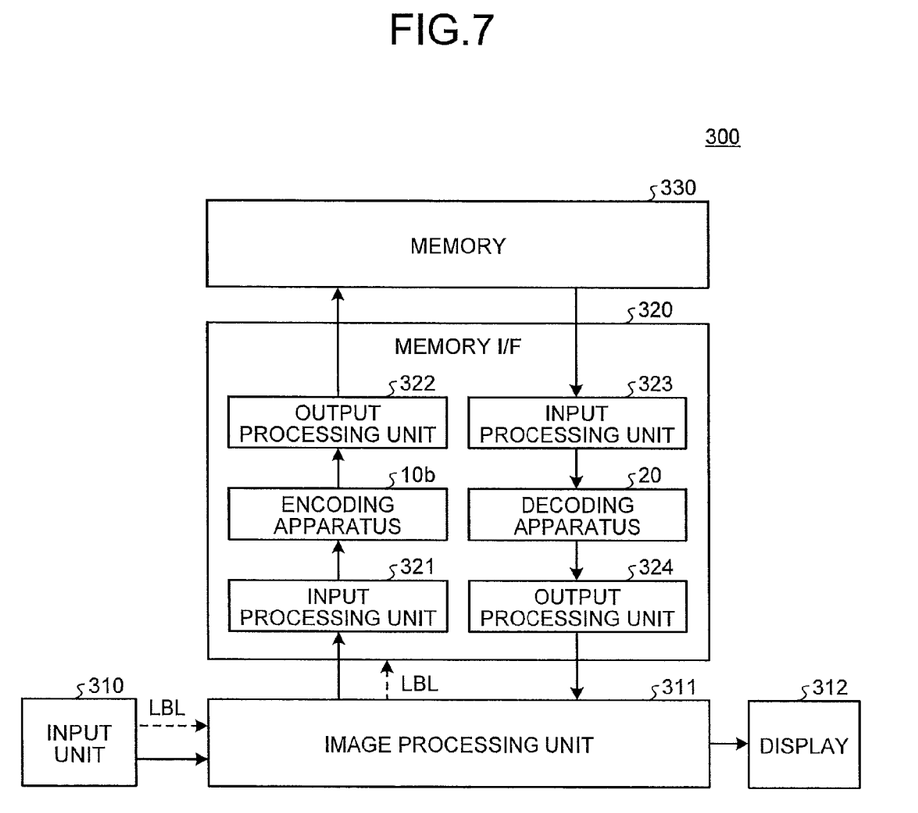
FIG. 7 is a block diagram illustrating a configuration of an example of an image processing apparatus according to a second embodiment.

A second embodiment will now be described. The second embodiment is an example in which the above-described encoding apparatus 10b and decoding apparatus 20 according to the first embodiment are applied to an image processing apparatus including an image processing unit. FIG. 7 illustrates a configuration of an example of an image processing apparatus 300 according to the second embodiment. Here, a video apparatus that is supplied with image data according to a Hi-Vision image as input and that supplies the image data to a display is applied as an example of the image processing apparatus 300.

The image processing apparatus 300 includes an input unit 310, an image processing unit 311, and a display 312. The input unit 310 is supplied with image data as input. The input unit 310 accepts image data input. An input source of the Hi-Vision image is not especially restricted. However, various sources such as a tuner that receives digital television broadcast, a player that reproduces a disk recording medium such as a Blu-ray (trademark) disk, and a computer device are conceivable. The input unit 310 supplies image data, which is input, to the image processing unit 311. Furthermore, the input unit 310 discriminates whether the input image data is image data according to the LBL system or image data according to the ordinary system, and supplies a discrimination signal which indicates a discrimination result to the image processing unit 311 as an input mode signal $M_0$.

The image processing unit 311 conducts predetermined image processing on the supplied image data by using a memory 330. Kinds of image processing conducted by the image processing unit 311 are not especially restricted. However, various kinds such as enhancement processing, frame rate conversion processing, color tone adjustment processing, and resolution conversion processing are conceivable.

The image processing unit 311 can conduct the above-described image processing by using the memory 330. As an example, the image processing unit 311 stores image data supplied from the input unit 310 into the memory 330 via a memory interface (I/F) 320 once. The image processing unit 311 conducts image processing on image data with, for example, a pixel taken as unit, while reading out image data from the memory via the memory I/F 320. Image data subjected to the image processing are written into the memory 330 in order from the image processing unit 311 via the memory I/F 320.

The image data subjected to the image processing in the image processing unit 311 is supplied to the display 312. For example, the image processing unit 311 writes image data finished in image processing into the memory 330 via the memory I/F 320. Upon finishing the image processing on image data corresponding to one frame, the image processing unit 311 reads out image data from the memory 330 via the memory I/F 320, and supplies the image data to the display 312. The display 312 displays an image based upon the supplied image data.

In such a configuration of the image processing apparatus 300, the encoding apparatus 10b according to the first embodiment and the decoding apparatus 20 corresponding to the encoding apparatus 10b are applied to the memory I/F 320. More specifically, as exemplified in FIG. 7, the memory I/F 320 includes an input processing unit 321, the encoding apparatus 10b, and an output processing unit 322 as a configuration on an encoding side, and includes an input processing unit 323, the decoding apparatus 20, and an output processing unit 324 as a configuration on a decoding side.

Image data which is output from the image processing unit 311 in order of pixel with, for example, a line taken as unit is supplied to the memory I/F 320 and input to the input processing unit 321. Together therewith, a control signal indicating whether output image data is image data according to the LBL system is supplied from the image processing unit 311 to the memory I/F 320 and input to the encoding apparatus 10b. The input processing unit 321 conducts predetermined processing, such as embedding a signal indicating that image data is top of a frame, on input image data and outputs resultant image data to the encoding apparatus 10b as input pixel data $S_0$.

Furthermore, the input mode signal $M_0$ supplied from the image processing unit 311 is supplied to the encoding apparatus 10b and the decoding apparatus 20. The encoding apparatus 10b determines whether pixels on a line located one line above the object pixel are used or pixels on a line located two lines above the object pixel are used to conduct prediction, in accordance with the supplied input mode signal $M_0$. In the same way, the decoding apparatus 20 determines whether decoded pixels on a line located one line above the object decoded pixel are used or decoded pixels on a line located two lines above the object decoded pixel are used to conduct prediction, in accordance with the supplied input mode signal $M_0$.

Encoded data output from the encoding apparatus 10b are packed into a packet of, for example, a predetermined size by the output processing unit 322, and output from the memory I/F 320. The packet of encoded data output from the memory I/F 320 is written into the memory 330.

The memory I/F 320 is instructed by the image processing unit 311 to read out image data (encoded data) stored in the memory 330. The memory I/F 320 reads out encoded data from the memory 330 packet by packet, and inputs the encoded data to the input processing unit 323, in accordance with the instruction.

The input processing unit 323 supplies the input encoded data to the decoding apparatus 20. The decoding apparatus 20 decodes the input encoded data in accordance with the input mode signal $M_0$, and outputs decoded pixel data. The decoded pixel data which is output from the decoding apparatus 20 is shaped to a predetermined format by the output processing unit 324, and supplied to the image processing unit 311 from the memory I/F 320.

The size of image data stored in the memory 330 can be compressed by incorporating the encoding apparatus 10b according to the first embodiment and the decoding apparatus 20 into the memory I/F 320 for the memory 330 accessed by the image processing unit 311 and using them in this way. Furthermore, since encoding is conducted with a pixel taken as the unit, fast encoding/decoding processing is possible. In addition, the memory I/F 320 can conduct changeover as to whether to conduct encoding and decoding processing by using a pixel on a line on which the object pixel is located and pixels on a line located in the encoding (decoding) order one line before the line on which the object pixel is located, or whether to conduct encoding and decoding processing by using a pixel on a line on which the object pixel is located and pixels on a line located in the encoding (decoding) order two lines before the line on which the object pixel is located, on the basis of the input mode signal $M_0$. Therefore, it is possible to cope with both image data according to the LBL system and ordinary image data which is not according to the LBL system, with a common configuration.

The present invention brings about an effect that image data in which different images are arranged alternately every line can be suitably subjected to compression encoding.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An encoding apparatus comprising:
   an encoding unit configured to encode a difference between an input pixel included in input image data and a predicted pixel obtained by predicting the input pixel;
   a first storage unit configured to store a decoded pixel obtained by decoding the difference encoded by the encoding unit and adding the predicted pixel to the decoded difference;
   a prediction direction determination unit configured, in a case where the input image data is compound image data including different images with a line period of at least two lines, to determine a direction from a decoded pixel that is included in a second decoded pixel, a third decoded pixel, and fourth decoded pixels stored in the first storage unit and that has high correlation with a first decoded pixel, toward the first decoded pixel as a prediction direction, the first decoded pixel having a position in a line direction corresponding to an encoding object pixel, on a second line located, in an encoding order, a number of lines of the line period before a first line on which the encoding object pixel is located, the second decoded pixel being located, in an encoding order, one pixel before the first decoded pixel, the third decoded pixel having an on-line position corresponding to the first decoded pixel on a third line located, in an encoding order, the number of lines before the second line, the fourth decoded pixels including decoded pixels next to the third decoded pixel on the third line; and
   a selection unit configured to select a decoded pixel from the first storage unit in accordance with the prediction direction determined by the prediction direction determination unit, and output the decoded pixel as the predicted pixel.

2. An encoding method comprising:
   an encoding step of encoding a difference between an input pixel included in input image data and a predicted pixel obtained by predicting the input pixel;
   a first storage step of storing a decoded pixel obtained by decoding the difference encoded by the encoding step and adding the predicted pixel to the decoded difference, into a first storage unit;
   a prediction direction determination step of, in a case where the input image data is compound image data including different images with a line period of at least two lines, determining a direction from a decoded pixel that is included in a second decoded pixel, a third decoded pixel, and fourth decoded pixels stored in the first storage unit and that has high correlation with a first decoded pixel, toward the first decoded pixel as a prediction direction, the first decoded pixel having a position in a line direction corresponding to an encoding object pixel, on a second line located, in an encoding order, a number of lines of the line period before a first line on which the encoding object pixel is located, the second decoded pixel being located, in an encoding order, one pixel before the first decoded pixel, the third decoded pixel having an on-line position corresponding to the first decoded pixel on a third line located, in an encoding order, the number of lines before the second line, the fourth decoded pixels including decoded pixels next to the third decoded pixel on the third line; and
   a selection step of selecting a decoded pixel from the first storage unit in accordance with the prediction direction determined by the prediction direction determination step, and output the decoded pixel as the predicted pixel.

3. A non-transitory computer-readable recording medium that stores therein a computer program for causing a computer to execute an encoding method, the method comprising:
   an encoding step of encoding a difference between an input pixel included in input image data and a predicted pixel obtained by predicting the input pixel;
   a first storage step of storing a decoded pixel obtained by decoding the difference encoded by the encoding step and adding the predicted pixel to the decoded difference, into a first storage unit;
   a prediction direction determination step of, in a case where the input image data is compound image data including different images with a line period of at least two lines, determining a direction from a decoded pixel that is included in a second decoded pixel, a third decoded pixel, and fourth decoded pixels stored in the first storage unit and that has high correlation with a first decoded pixel, toward the first decoded pixel as a prediction direction, the first decoded pixel having a position in a line direction corresponding to an encoding object pixel, on a second line located, in an encoding order, a number of lines of the line period before a first line on which the encoding object pixel is located, the second decoded pixel being located, in an encoding order, one pixel before the first decoded pixel, the third decoded pixel having an on-line position corresponding to the first decoded pixel on a third line located, in an encoding order, the number of lines before the second line, the fourth decoded pixels including decoded pixels next to the third decoded pixel on the third line; and
   a selection step of selecting a decoded pixel from the first storage unit in accordance with the prediction direction determined by the prediction direction determination step, and output the decoded pixel as the predicted pixel.

* * * * *